(12) United States Patent
Spada et al.

(10) Patent No.: US 9,227,508 B2
(45) Date of Patent: Jan. 5, 2016

(54) DEVICE FOR ACCUMULATION AND EVAPORATION OF LIQUID FUEL ORIGINATED FROM CONDENSATION OF FUEL VAPOURS IN THE VENT CONDUIT OF A MOTOR-VEHICLE TANK

(71) Applicant: FIAT GROUP AUTOMOBILES S.P.A., Turin (IT)

(72) Inventors: Luigi Spada, Turin (IT); Marco Riaudo, Turin (IT); Giuseppe Bussi, Turin (IT)

(73) Assignee: FIAT GROUP AUTOMOBILES S.P.A., Turin (IT)

(*) Notice: Subject to any disclaimer, the term of this patent is extended or adjusted under 35 U.S.C. 154(b) by 0 days.

(21) Appl. No.: 14/328,007

(22) Filed: Jul. 10, 2014

(65) Prior Publication Data
US 2015/0202956 A1    Jul. 23, 2015

(30) Foreign Application Priority Data

Jan. 23, 2014  (IT) .............................. TO2014A0045

(51) Int. Cl.
*B60K 15/035*   (2006.01)

(52) U.S. Cl.
CPC . *B60K 15/03504* (2013.01); *B60K 2015/03509* (2013.01); *B60K 2015/03514* (2013.01); *B60K 2015/03523* (2013.01)

(58) Field of Classification Search
CPC ......................... B60K 15/03504; B60K 15/035
USPC .................................. 220/746, 745, 749, 562
See application file for complete search history.

(56) References Cited

U.S. PATENT DOCUMENTS

| RE21,470 | E | * | 5/1940 | White | F17C 7/04 137/364 |
|---|---|---|---|---|---|
| 3,542,239 | A | * | 11/1970 | Seiden | B60K 15/03504 123/519 |
| 4,815,436 | A | * | 3/1989 | Sasaki | B60K 15/03504 123/520 |
| 4,829,968 | A | * | 5/1989 | Onufer | B60K 15/03504 123/518 |

(Continued)

FOREIGN PATENT DOCUMENTS

| DE | 19609322 A1 * | 9/1996 | ........... B60K 15/035 |
|---|---|---|---|
| DE | 200 19 968 | 3/2001 | |

(Continued)

OTHER PUBLICATIONS

Search Report for IT TO20140045 dated May 2, 2014.

*Primary Examiner* — Robert J Hicks
(74) *Attorney, Agent, or Firm* — Nixon & Vanderhye P.C.

(57) ABSTRACT

A fuel tank for a motor-vehicle includes a vent conduit connected to a canister arranged outside of the tank for absorbing fuel vapors. The vent conduit has a portion arranged inside the tank with an intermediate portion located at a lowermost position, which creates a zone in which liquid fuel tends to stagnate, which is originated from condensation of the vapors inside the vent conduit. The tank further includes a conduit for draining the liquid fuel originated from condensation of vapors present within the vent conduit. The draining conduit extends downwardly starting from the zone and ends with a closed end portion acting as accumulator and evaporator of the fuel. The closed end portion is arranged at an area which can reach a temperature sufficient for causing evaporation of the condensed fuel and elimination thereof by a flow in an opposite direction through the draining conduit and then through the vent conduit towards the canister.

4 Claims, 3 Drawing Sheets

(56) References Cited

U.S. PATENT DOCUMENTS

| | | | | |
|---|---|---|---|---|
| 5,431,144 | A * | 7/1995 | Hyodo | B60K 15/03504 123/520 |
| 6,089,249 | A * | 7/2000 | Thibaut | B60K 15/035 123/516 |
| 6,591,866 | B2 * | 7/2003 | Distelhoff | B60K 15/03504 123/514 |
| 2005/0211310 | A1 * | 9/2005 | Aschoff | B60K 15/035 137/565.22 |
| 2009/0065513 | A1 * | 3/2009 | Kraemer | B60K 15/03519 220/600 |
| 2014/0053947 | A1 * | 2/2014 | Baldwin | B60K 15/035 141/7 |

FOREIGN PATENT DOCUMENTS

| | | | |
|---|---|---|---|
| EP | 0773128 A2 * | 5/1997 | ....... B60K 15/03519 |
| EP | 0 943 476 | 9/1999 | |
| EP | 1 063 117 | 12/2000 | |
| EP | 1 325 829 | 7/2003 | |
| EP | 1 518 739 | 3/2005 | |
| JP | 5-310050 | 11/1993 | |

\* cited by examiner

US 9,227,508 B2

DEVICE FOR ACCUMULATION AND EVAPORATION OF LIQUID FUEL ORIGINATED FROM CONDENSATION OF FUEL VAPOURS IN THE VENT CONDUIT OF A MOTOR-VEHICLE TANK

This application claims priority to Italian Patent Application No. TO2014A000045 filed Jan. 23, 2014, the entire content of which is hereby incorporated by reference.

FIELD OF THE INVENTION

The present invention relates to fuel tanks for motor-vehicles, of the type in which a vent conduit is provided which is connected to a so-called "canister" device, the canister being arranged at the outside of the tank and being provided with a filter (such as an active carbon filter) for absorbing the fuel vapours which are present in the vent conduit.

A solution of the above indicated type is known for example from document EP 1 063 117 A2 of the same applicant.

In systems of this type also a liquid/vapour separator device is provided which is interposed in the vent conduit, upstream of the canister, this separator device being adapted to separate droplets of liquid fuel from fuel vapours directed to the canister, in order to avoid that liquid reaches the filter of the canister, thus preventing a proper operation thereof.

In recent years, there has been an increased use of control systems of fuel vapours of the above indicated type, in which the liquid/vapour separator device is provided inside the tank, so that the vent conduit at the exit of the separator device has a portion contained inside the tank, at the upper part of the latter. The upper wall of the tank is often shaped with recesses in order to allow for the necessary space for parts of the vehicle under which the tank is located. Due to this configuration of the tank upper wall, the part of the vent conduit which is inside the tank has an intermediate portion located at a lowermost position, which creates a siphon-like area in which liquid fuel tends to stagnate, this liquid fuel being originated by a condensation of the vapours within the vent conduit, which takes place for example when the vehicle is left parked in low temperature conditions. It follows that during subsequent use of the vehicle, droplets of the condensed liquid fuel may be carried by the flow of air and vapours through the vent conduit so as to finally reach the canister, thus preventing a proper operation thereof.

OBJECT OF THE INVENTION

The object of the present invention is that of solving this problem in a simple and efficient way.

In view of achieving this object, the invention provides a fuel tank for a motor vehicle of the above indicated type, in which a vent conduit is provided connected to a canister for the absorption of fuel vapours arranged outside the tank, wherein said vent conduit has a part inside the tank with an intermediate portion located at a lowermost position, which creates a siphon-like zone in which liquid fuel originated from a condensation of the vapours within the vent conduit tends to stagnate, said tank being characterized in that it further comprises a conduit for draining said liquid fuel originated from the condensation of fuel vapours inside the vent conduit, in that the draining conduit extends downward from said siphon-like zone and ends with a closed end portion acting as an accumulator and evaporator of the liquid fuel originated from condensation of the vapours, said closed end portion being placed at an area which reaches a temperature sufficient to cause the re-evaporation of the condensed fuel, and elimination thereof by its reverse flow through the draining conduit and then through the vent conduit, in the direction towards the canister.

In a first embodiment, said closed end portion acting as evaporator is placed within the lower part of the tank, so as to be predominantly immersed in the fuel and to be thereby maintained at a temperature sufficient for the evaporation, due to thermal inertia of the fuel mass within the tank.

In a second embodiment, said closed end acting as evaporator is arranged outside the tank, at an area adjacent to a heat source, such as adjacent to the exhaust pipe of the motor-vehicle.

The additional volume defined by said draining conduit has a double function: accumulating liquid fuel during stages in which fuel vapours tend to condensate due to low temperature conditions; and favouring the evaporation of the condensed liquid in the stages in which the motor-vehicle engine is operative.

BRIEF DESCRIPTION OF THE FIGURES

Further features and advantages of the invention will become apparent from the following description with reference to the annexed drawings, given purely by way of non limiting example, in which.

DETAILED DESCRIPTION OF THE INVENTION

Figure 1:
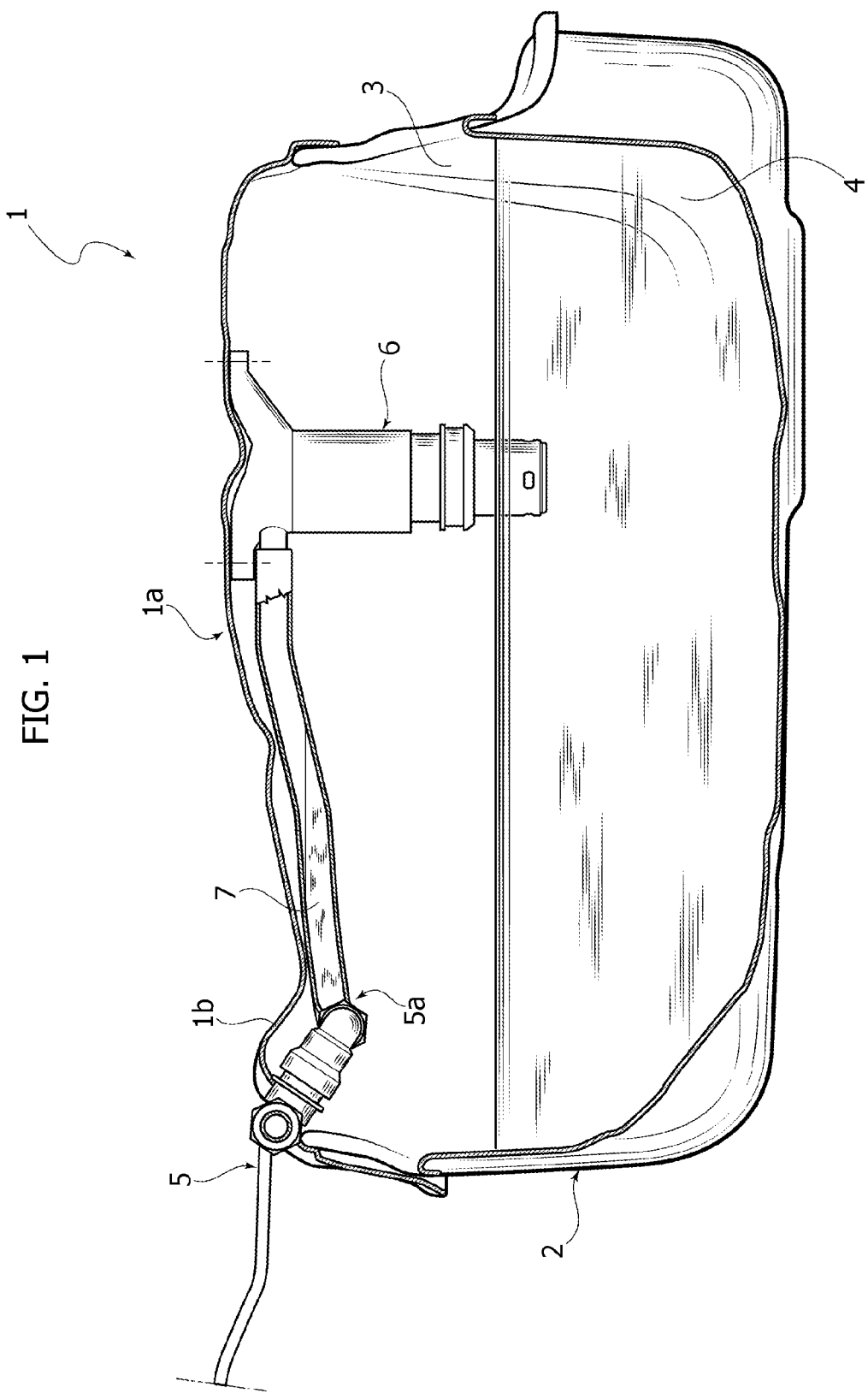
FIG. 1 is a cross-sectional view of a fuel tank according to the prior art.

In FIG. 1, reference numeral 1 generally designates a fuel tank having a body 2 constructed in any known manner and with any material which is conventionally used for this purpose. Body 2 of tank 1 defines inside thereof a chamber 3 for containing fuel 4 in a liquid state.

Reference numeral 5 designates a vent conduit projecting outside of tank 1 and connected to a so-called "canister" device (not shown in the drawings) of any known type including an active carbon filter for absorbing gasoline vapours which are contained in the air flow which travels through conduit 5.

Conduit 5 has a portion contained inside tank 1, in the upper portion thereof. In the case of the illustrated example, conduit 5 extends from a liquid/vapour separator device designated by reference numeral 6, which is arranged inside the tank.

As can be seen, the upper wall 1a of tank 1 has a shaped configuration, with a recess 1b due to the need of allowing for the necessary space for the structure of the motor-vehicle rear seat, under which tank 1 is to be arranged. The portion of vent conduit 5 arranged inside the tank 1 extends along the upper part of the inner chamber 3 of the tank, adjacent to the upper wall 1a. As a result of the presence of recess 1b, the inner portion of conduit 5 has an intermediate portion located at a lowermost level with respect to the end of conduit 5 connected to the separator device 6 and also with respect to the zone in which the conduit 5 projects outside of the tank 1. Therefore, portion 5a tends to define a siphon-like zone in which liquid fuel 7 tends to stagnate, this liquid fuel being originated from a condensation of the vapours contained in the vent conduit 5, for example when the motor-vehicle is left parked in low temperature conditions.

Since the siphon-like zone 5a is arranged downstream of the separator device 6, there is the risk that liquid droplets of fuel move from this zone along conduit 5 until reaching the canister arranged downstream of the tank, thus preventing a proper operation thereof.

In order to solve this problem, the tank according to the invention is provided with a conduit 8 (see FIGS. 2 and 3) for draining liquid fuel 7 which condenses at the siphon-like zone 5*a*. Conduit 8 extends starting from the lowermost position of the siphon-like zone 5*a* and ends with a closed end portion 8*a* which in the illustrated embodiment is arranged inside the tank, in the lower portion thereof, so that it is predominantly immersed within the fuel and kept thereby at a relatively higher temperature, due to the thermal inertia of the fuel.

Figure 2:
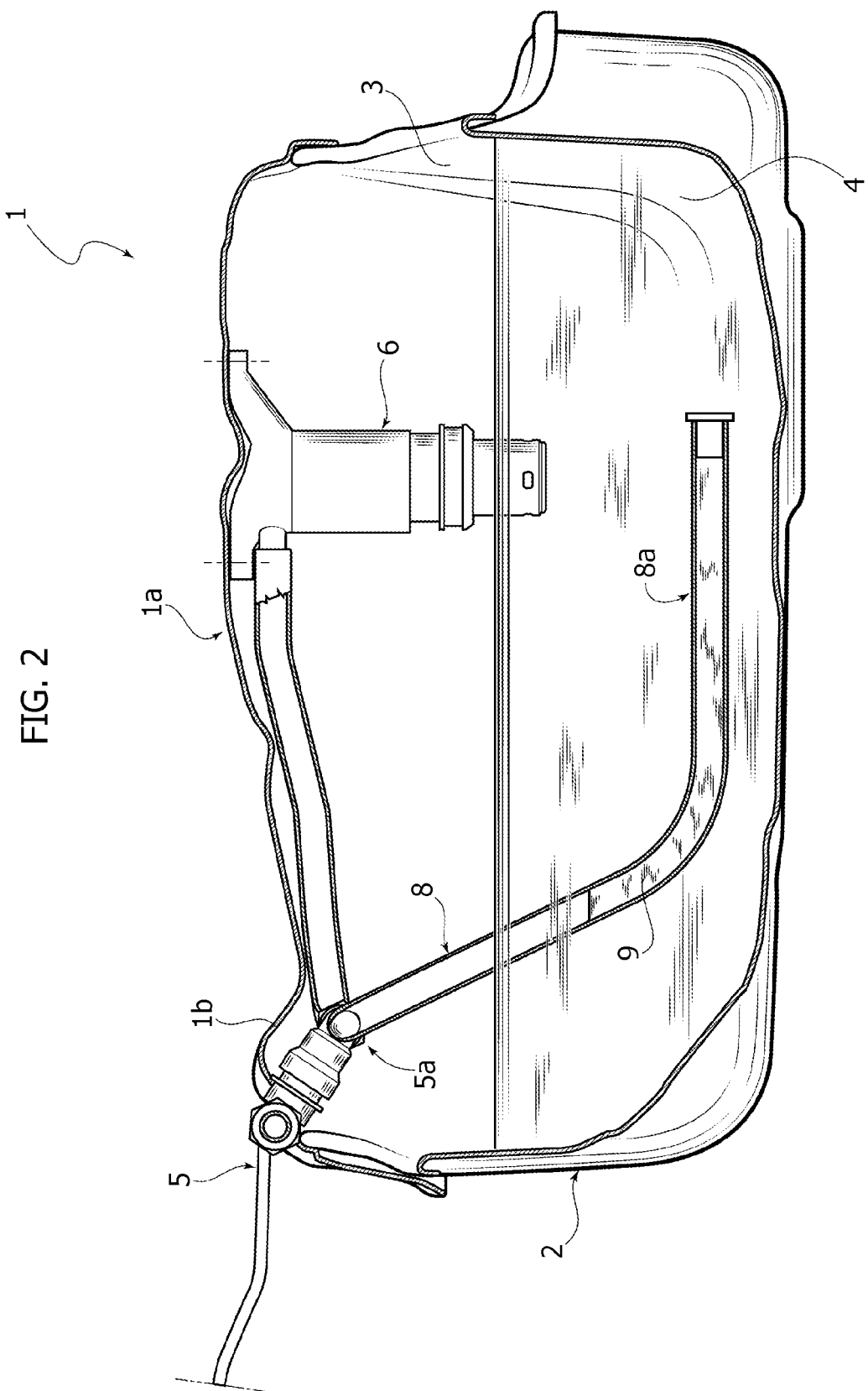
FIGS. 2, 3 show an embodiment of the tank according to the invention into different operative conditions.
Figure 3:
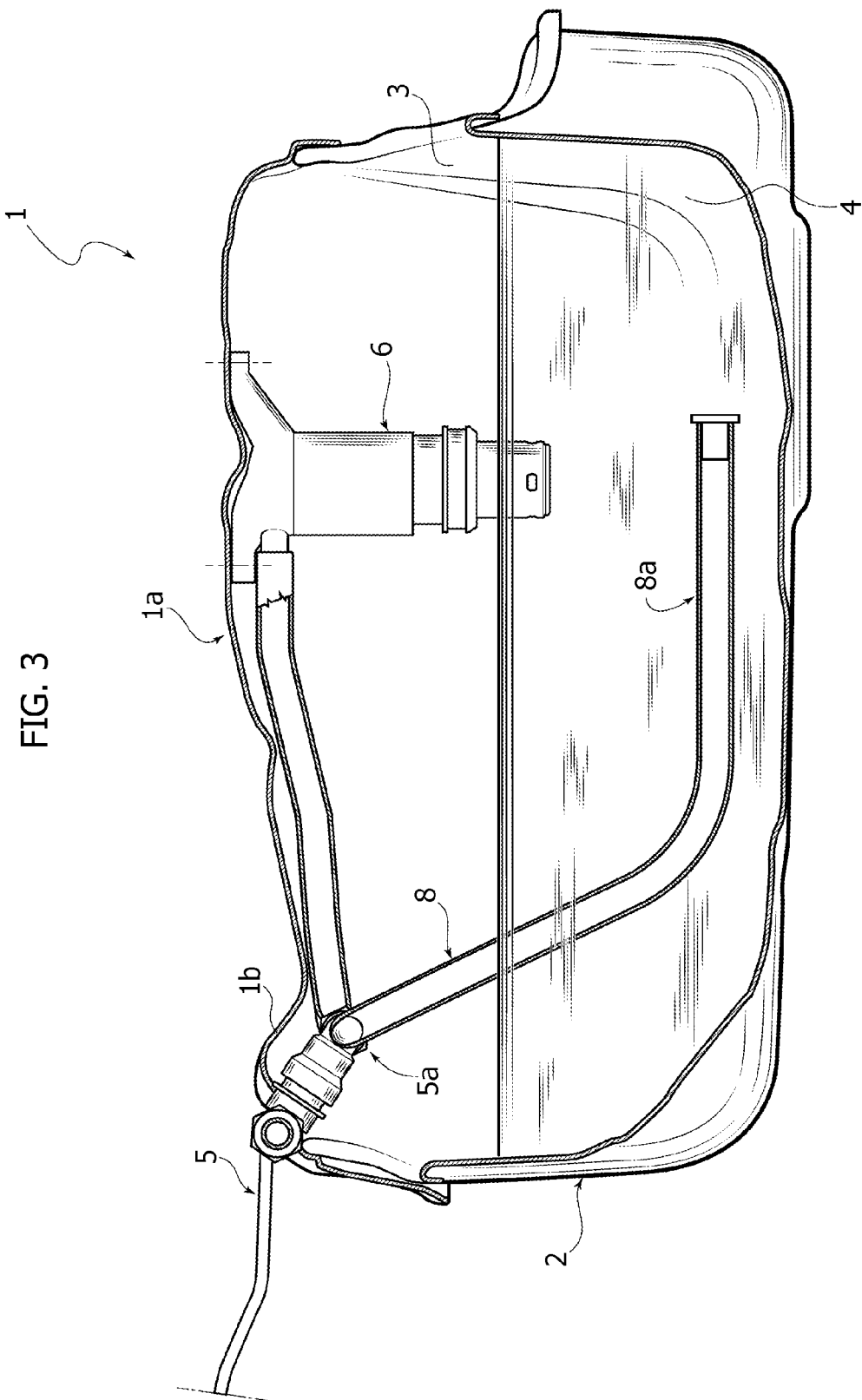

As shown in FIG. 2, the terminal portion of the draining conduit 8 defines a chamber 9 for accumulation of the liquid fuel originated from condensation of the vapours within conduit 5. As shown in FIG. 3, the relatively higher temperature of the fuel in which the terminal portion 8*a* is immersed causes a re-evaporation of the fuel 9. The fuel vapours generated thereby travel in the opposite direction along the draining conduit 8 and then along the vent conduit 5 towards the canister.

In a second embodiment (not shown in the drawings) the draining conduit 8 projects outside of the tank 1 and has its terminal portion 8*a* at an area adjacent to a heat source, such as the motor-vehicle exhaust pipe.

In a variant applicable to both embodiments, the terminal portion 8*a* of the draining conduit is provided on its outer surface with fins, for increasing of the heat exchange surface.

Therefore, due to the above indicated features, the present invention is able to solve in an extremely simple and inexpensive manner the problem due to a stagnation of the liquid fuel originated from condensation of fuel vapours inside the vent conduit, in proximity of the siphon-like zone 5*a* which is created as a result of the shaped configuration of the tank.

Naturally, while the principle of the invention remains the same, the details of construction and the embodiments may widely vary with respect to what has been described and illustrated purely by way of example, without departing from the scope of the present invention.

What is claimed is:

1. Fuel tank for a motor vehicle, wherein a vent conduit is provided which is connected to a canister for the absorption of fuel vapors, the canister being arranged outside the tank, wherein said vent conduit has a part inside the tank with an intermediate portion located at a lowermost position, which creates a zone in which liquid fuel originated from condensation of the vapors present in the vent conduit tends to stagnate, wherein said tank further comprises a conduit for draining said liquid fuel, in that the draining conduit extends downwards from said zone and ends with a closed end portion acting as an accumulator and evaporator of the liquid fuel originated from condensation of the vapors, said closed end portion being placed at an area which reaches a temperature sufficient to cause re-evaporation of the condensed fuel, and elimination thereof by reverse flow of the re-evaporated fuel through the draining conduit and then through the vent conduit, in the direction towards the canister.

2. Tank according to claim 1, wherein the aforesaid closed end portion acting as the fuel accumulator and evaporator is placed within the lower part of the tank, so as to be predominantly immersed in the fuel.

3. Tank according to claim 1, wherein the aforesaid closed end portion acting as fuel accumulator and evaporator is disposed outside the tank, in an area close to a heat source.

4. Tank according to claim 1, wherein the aforesaid closed end portion of the draining conduit is provided on its outer surface with heat transfer fins.

* * * * *